United States Patent
Sato

(10) Patent No.: US 6,574,205 B1
(45) Date of Patent: Jun. 3, 2003

(54) CDMA CELLULAR SYSTEM AND METHOD OF DETECTING SPREADING CODE IN CDMA CELLULAR SYSTEM

(75) Inventor: Toshifumi Sato, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/301,772

(22) Filed: Apr. 29, 1999

(30) Foreign Application Priority Data

May 1, 1998 (JP) .......................................... 10-122318

(51) Int. Cl.$^7$ .............................................. H04B 7/216
(52) U.S. Cl. ...................... 370/335; 370/342; 370/341; 370/320; 370/441; 370/431; 370/329; 455/502; 375/130; 375/141; 375/142; 375/145; 375/146; 375/147
(58) Field of Search ................................ 370/329, 341, 370/342, 320, 335, 431, 441; 375/130, 141, 142, 145, 146, 147, 149, 150, 144, 148; 455/502

(56) References Cited

U.S. PATENT DOCUMENTS

| | | | | | |
|---|---|---|---|---|---|
| 4,969,159 | A | * | 11/1990 | Belcher et al. | 375/153 |
| 5,345,469 | A | * | 9/1994 | Fulghum | 370/342 |
| 5,375,140 | A | * | 12/1994 | Bustamante et al. | 375/142 |
| 5,481,533 | A | * | 1/1996 | Honig et al. | 370/335 |
| 5,544,155 | A | * | 8/1996 | Lucas et al. | 370/342 |
| 5,790,588 | A | * | 8/1998 | Fukawa et al. | 375/148 |
| 6,018,667 | A | * | 1/2000 | Ghosh et al. | 455/502 |
| 6,167,037 | A | * | 12/2000 | Higuchi et al. | 370/335 |
| 6,208,632 | B1 | * | 3/2001 | Kowalski et al. | 370/335 |
| 6,304,759 | B1 | * | 10/2001 | Jiang et al. | 455/502 |
| 6,370,134 | B1 | * | 4/2002 | Aramaki | 370/342 |

FOREIGN PATENT DOCUMENTS

| | | |
|---|---|---|
| JP | 60-177719 | 9/1985 |
| JP | 7107006 | 4/1995 |
| JP | A-8-88587 | 4/1996 |
| JP | 9-55685 | 2/1997 |
| JP | 9247744 | 9/1997 |
| JP | 9271071 | 10/1997 |
| JP | 1042341 | 2/1998 |
| WO | 97/33400 | 9/1997 |

* cited by examiner

Primary Examiner—William Trost
Assistant Examiner—Shared Rampuria
(74) Attorney, Agent, or Firm—Dickstein, Shapiro, Morin & Oshinsky, LLP.

(57) ABSTRACT

A CDMA cellular system does not require accurate synchronization between all base stations and is capable of distinguishing the base stations from each other without the need for a complex process. When two element codes are multiplied with shifted timing to generate a spreading code, different codes that do not agree with each other when cyclically shifted are generated for the respective base stations. Spreading codes of the base stations are distinguished even when the base stations are not kept in synchronism with each other. In the CDMA cellular system which uses such spreading codes, when frame synchronization is achieved using a perch channel spread by a spreading code that is common to all the base stations, a signal transmitted from one of the base stations is de-spread on the basis of a first element code which is of the same timing (phase) with respect to a frame in all the base stations. Since the de-spread signal is a signal produced by shifting a second element code with timing (phase) which differs from base station to base station, a spreading code that is being used can be identified by a correlated value calculating unit.

16 Claims, 2 Drawing Sheets

CDMA CELLULAR SYSTEM AND METHOD OF DETECTING SPREADING CODE IN CDMA CELLULAR SYSTEM

BACKGROUND OF THE INVENTION

1. Field of the Invention

The present invention relates to an automobile telephone system or portable telephone system (cellular system) based on direct spreading code division multiple access (DS-CDMA), and more particularly to a circuit for detecting a spreading code used by a base station in a cell where a mobile terminal of a cellular system is present.

2. Description of the Related Art

One conventional CDMA cellular system is a North American standard cellular system known as IS95. According to IS95, all base stations use a relatively long spreading code which is of about 26.6 ms ($=2^{15}$ chip period). The phase or starting time of the spreading code is shifted different intervals for the respective base stations to allow a cellular terminal to distinguish the base stations from each other.

In the case where the phase or starting time of the spreading code is shifted different intervals for the respective base stations, since the cellular terminal only needs to search for the single spreading code when it is switched on, initial synchronization only can be performed using a simple sliding correlator. However, because the shifted code is distinguished only with the phase or starting time, if the base stations are shifted out of synchronism for transmission timing, then it is impossible to differentiate the spreading code phases for the respective base stations.

For the above reason, it is necessary for all the base stations to be synchronized with an accuracy of several chips, e.g., several microseconds for IS95. According to IS95, the base stations are maintained in synchronism with each other by the GPS (Global Positioning System).

Another conventional CDMA cellular system is known as W-CDMA (wide-band code division multiple access) that has not yet been put to practical use but for which standardization efforts are presently being made by Association of Radio Industries and Businesses (ARIB) in Japan.

According to W-CDMA, accurate synchronization of a plurality of base stations is achieved not by shifting the phase or starting time of a spreading code between the base stations, but by using different spreading codes, e.g., Gold codes, for the respective base stations. Since the spreading codes used between the base stations are different from each other, the spreading codes of the base stations can be distinguished from each other even when the base stations are not kept in accurate synchronism with each other.

In order to identify a base station, however, a cellular terminal has to search all possible spreading codes. Therefore, a large-scale piece of hardware and a long period of time are required to perform a process of searching for a cell where the base station is located.

For reducing the period of time required for a cell search, there has been proposed a two- or three-stage search scheme for use with W-CDMA.

According to the three-stage search scheme, spreading codes (long codes) used by base stations are divided into a plurality of groups, and each of the base stations periodically transmits, in addition to an ordinary transmission code, a first short code (1), common to all the base stations, indicative of the starting time of the transmission of the spreading code, and a second short code (GID) indicative of the group number of the used long code.

The three-stage search process comprises first, second, and third stages.

In the first stage, the cellular terminal searches for the first short code to detect the starting time of the transmission of the long code.

In the second stage, the cellular terminal detects the second short code (GID) to identify the group number of the used long code. Since the group number is identified, the number of long codes which have to be searched can be reduced to a fraction thereof inversely proportional to the number of groups.

In the third stage, the cellular terminal uses all possible long codes to de-spread the received signal to decide whether a long code that can properly be received is an actually used long code or not.

The above conventional CDMA cellular systems suffer the following disadvantages:

(1) Because the shifted code is distinguished only with the phase or starting time, if the base stations are shifted out of synchronism for transmission timing, then it is impossible to differentiate the spreading code phases for the respective base stations. Thus, as with the IS95 system, if all the base stations use one spreading code shifted in phase, then the CDMA cellular system needs a synchronizing signal to keep all the base stations in accurate synchronism with each other for transmission timing. The CDMA cellular system could not be constructed in the absence of an appropriate external synchronizing signal such as a synchronizing signal from the GPS, for example.

Furthermore, the GPS is basically a U.S. military system and may possibly be put out of service for security reasons. If the GPS becomes inoperative unexpectedly, then the CDMA cellular system is abruptly shut off. Another problem is that areas where GPS antennas cannot be installed, e.g., indoor areas, underground areas, etc. cannot be used as service areas of the CDMA cellular system.

(2) In the CDMA cellular system, one frequency is shared by a plurality of channels, and hence it is necessary to minimize interchannel interference. To meet such a requirement, signals are transmitted with a minimum required level of transmission power in each channel. In order to identify a spreading code that is being used, the spreading code needs to be actually de-de-spread to decide whether the spreading code is being used or not. Since it is necessary to de-spread all possible spreading codes in an exhaustive fashion, the process of detecting whether there is a signal or not is complex.

SUMMARY OF THE INVENTION

It is therefore an object of the present invention to provide a CDMA cellular system which does not require accurate synchronization between all base stations and is capable of distinguishing the base stations from each other without the need for a complex process, and a method of detecting a spreading code in such a CDMA cellular system.

According to the present invention, when two element codes are multiplied with shifted timing to generate a spreading code, different codes that do not agree with each other when cyclically shifted are generated for the respective base stations. Spreading codes of the base stations are distinguished even when the base stations are not kept in synchronism with each other.

In a CDMA cellular system which uses such spreading codes, when frame synchronization is achieved using a perch channel spread by a spreading code that is common to all the base stations, a signal transmitted from one of the base stations is de-spread on the basis of a first element code which is of the same timing (phase) with respect to a frame in all the base stations. Since the de-spread signal is a signal produced by shifting a second element code with timing (phase) which differs from base station to base station, a spreading code that is being used can be identified by a correlated value calculating unit.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
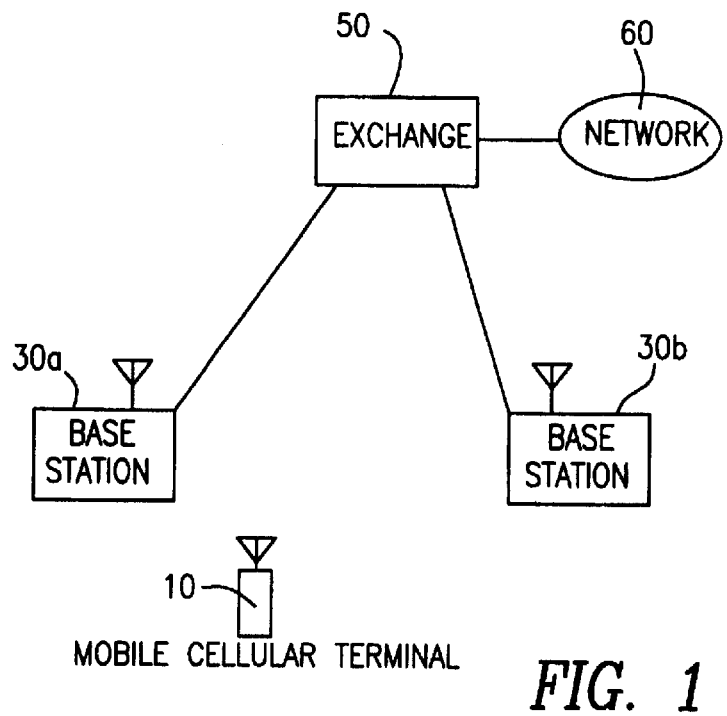
FIG. 1 is a block diagram of a CDMA cellular system according to the present invention.

The principles of the present invention are applicable to a cellular system in which frame timing is informed over a perch channel spread by a spreading code used commonly by all base stations and codes generated as combinations of two pseudo-random codes (PN codes), e.g., Gold codes generated as combinations of two M (M is a natural number) sequences, are used as different codes for respective base stations.

For example, two PN codes having a code length N (N is a natural number) can be combined into (N+2) codes that are different from each other. The number of codes that are generated is equal to the sum (N+2) of 2 (only one of the two codes is used at a time) and N (one of the two codes is shifted with respect to the other by 0 through N−1). The codes that agree with each other when one of the two codes is cyclically shifted with respect to the other are regarded as the same code.

Using the codes that do not agree with each other when shifted with respect to each other, the base stations can be distinguished from each other even if all the base stations are not in synchronism with each other.

For easier frame timing detection, a channel (perch channel) for informing frame timing may be periodically transmitted in synchronism with the frame timing using a short code or may successively be transmitted with a low level of power using a spreading code having a length equal to a frame length. Alternatively, connected spreading codes for modulating a short code with another code having a period equal to a frame length and transmitting the modulated code may be employed.

Since the spreading code of a channel (perch channel) for informing frame timing is used commonly by all the base stations, if the base stations are not in synchronism with each other, then two or more base stations may possibly agree in timing with each other, so that perch channels may be transmitted and received in a superposed fashion. Even in this case, because the perch channels have the same frame timing, they can properly be received by a cellular terminal.

Inasmuch as channels for carrying data are spread by different codes for the respective base stations, they can be received without interfering with each other even if they have the same frame timing.

A process of generating different spreading codes for the respective base stations will be described below.

Two PN codes, i.e., a first PN code PN1 and a second PN code PN2, are generated in synchronism with the frame timing.

The phase or initial value of the first PN code PN1 is shared by all the base stations, and the phase or initial value of the second PN code PN2 is varied for the respective base stations to distinguish the base stations from each other. Since the two PN codes are combined with each other for each of all the base stations, the codes of all the base stations are different from each other. Therefore, even if the base stations are kept out of synchronism with each other, a cellular terminal can determine from which base station it is receiving a signal.

As described above, a system using different spreading codes for the respective base stations does not allow a cellular terminal to immediately determine which spreading code is used to spread a transmitted signal even when frame synchronization is achieved. Therefore, the cellular terminal needs to change spreading codes to determine a correlation and generate the spreading code which is being used based on the determined correlation.

According to the present invention, as described below, it is possible to identify the spreading code which is being used, with the conventional sliding correlator. Specifically, once frame synchronization is achieved, since the first PN code is automatically determined among the different spreading codes for the respective base stationer identifying the spreading code which is being used is equivalent to detecting the phase of the second PN code. Therefore, the same process as the one used in the IS95 system is applicable.

Operation of a cellular terminal to generate a spreading code will be described below.

When the cellular terminal receives a perch channel spread by a short spreading code, it achieves frame synchronization with a base station which transmits a signal whose reception level is the highest, i.e., a base station which is normally positioned most closely to the cellular terminal. If multipath signals are combined by the RAKE processing, then the cellular terminal is synchronized with the timing of a subpeak that is detected within a certain range of delays from the timing of a signal whose reception level is the highest.

The spreading codes of the base stations comprise combinations of two PN codes. Since the phase of one of the PN codes, i.e., the first PN code PN1, is common to all the base stations, it is possible for the cellular terminal to be brought into phase with the base station at the time frame synchronization is achieved. While a spreading code is a combination of first and second PN codes PN1, PN2, the received signal is first de-spread by the first PN code PN1. If a spreading code for distinguishing a plurality of channels in the base station is used, then the received signal is de-spread also using such a spreading code.

If multipath signals are combined by the RAKE processing, then the received signal may be de-spread with the first PN code PN1 being timed for each path.

When the received signal is de-spread by the first PN code PN1, a signal is produced which has been spread only by the second PN code PN2. Inasmuch as the phase of the second PN code PN2 is different from base station to base station, the phase of the second PN code PN2 can be determined by sliding the same code and detecting a peak of a correlated value, as with the IS95 system.

If multipath signals are combined by the RAKE processing, then correlated values detected for the respective paths may be combined according to the RAKE processing, and a peak of the combined correlated values may be detected. Alternatively, a sliding correlation may be determined with respect to a single signal which is generated by combining signals which have been de-spread by the first PN code PN1 for the respective paths, according to the RAKE processing (the timing and the phase are weighted together by the reception level and added).

The latter process is capable of reducing the amount of calculations for determining a sliding correlation, but needs the phases of the respective paths to be known in advance using a perch channel or the like.

After the phase of the second PN code PN2 is determined, the first and second PN codes PN1, PN2 are combined to generate a replica of the spreading code of the base station with which frame synchronization has been achieved and which transmits a signal whose reception level is the highest. Subsequently, the received signal is de-spread by the generated replica of the spreading code for thereby receiving desired data.

Details of a CDMA cellular system according to the present invention will be described below with reference to FIGS. 1 through 3.

As shown in FIG. 1, the CDMA cellular system comprises a plurality of movable cellular terminals 10 (only one shown), a plurality of base stations 30a, 30b (only two shown) connected to the cellular terminals 10 via radio links, and at least one exchange 50 (only one shown) connected to the base stations 30a, 30b and a network 60, for changing connections between the base stations 30a, 30b and the cellular terminals 10 and controlling switching operation on the network 60.

Figure 2:
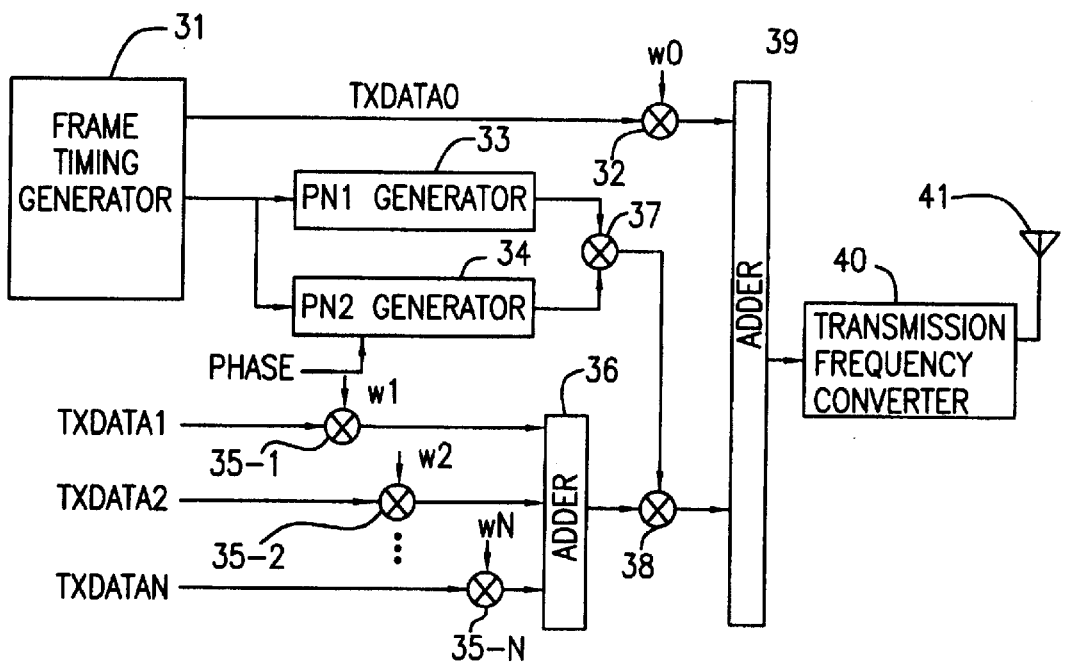
FIG. 2 is a block diagram of a transmitting section of a base station of the CDMA cellular system shown in FIG. 1.

The base station 30a has a transmitting section as shown in FIG. 2. As shown in FIG. 2, the transmitting section comprises a frame timing generator 31 for generating frame timing, a spreader 32 as a first spreading means for spreading a perch channel synchronous with the frame timing generated by the frame timing generator 31, with a spreading code w0 as a first spreading code which is shared by all the base stations, a PN1 generator 33 as a first element code generating means for generating a PN1 code as a first element code which is shared by all the base stations, based on the frame timing generated by the frame timing generator 31, a PN2 generator 34 as a second element code generating means for generating a PN2 code as a second element code which differs from base station to base station, based on the frame timing generated by the frame timing generator 31 and a phase or initial value which differs from base station to base station, a plurality of spreaders 35-1 through 35-N for spreading transmission data or signals with respective spreading codes w1 through wN that are used to distinguish a plurality of channels transmitted in the same base station, an adder 36 for adding the transmission signals spread by the spreaders 35-1 through 35-N, a multiplier 37 for multiplying the spreading code (PN1 code) generated by the PN1 generator 33 and the spreading code (PN2 code) generated by the PN2 generator 34 and outputting the product as a second spreading code, a spreader 38 as a second spreading means for spreading a sum transmission signal from the adder 36 with the second spreading code from the multiplier 37, an adder 39 for adding the perch channel spread by the spreader 32 and the transmission signal spread by the spreader 38, a transmission frequency converter 40 for converting a sum signal from the adder 39 into a radio signal, and an antenna 41 for transmitting the radio signal from the transmission frequency converter 40. The base stations 30a, 30b are identical in structure to each other.

Figure 3:
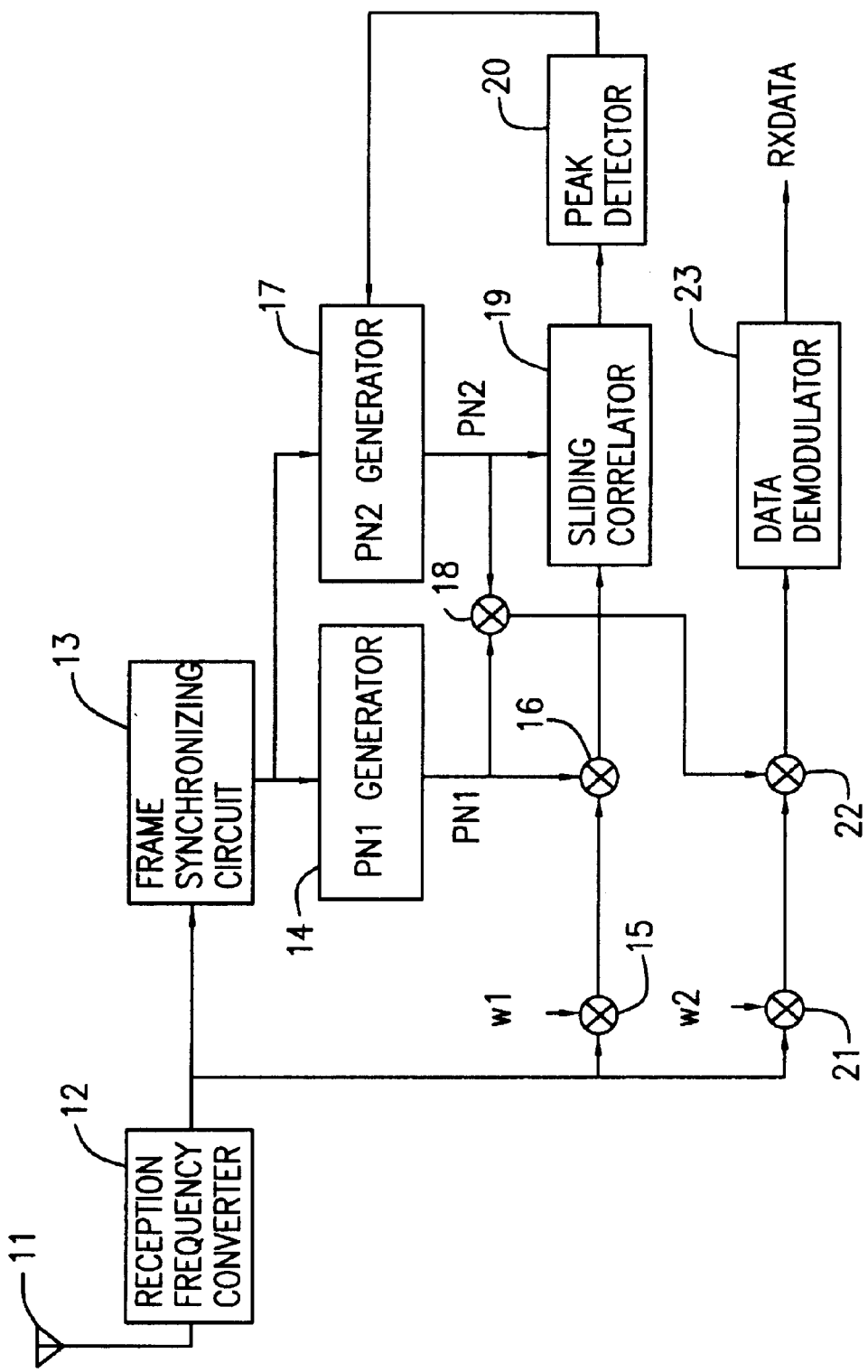
FIG. 3 is a block diagram of a receiving section of a cellular terminal of the CDMA cellular system shown in FIG. 1.

Each of the cellular terminals 10 has a receiving section as shown in FIG. 3. As shown in FIG. 3, the receiving section comprises an antenna 11 for receiving a radio signal, a reception frequency converter 12 for converting the radio signal from the antenna 11 into a baseband signal, a frame synchronizing circuit 13 as a detecting means for being supplied with a perch channel contained in the baseband signal from the reception frequency converter 12, achieving frame synchronization based on the supplied perch channel, and outputting frame timing, a PN1 generator 14 as a third element code generating means for generating a PN1 code in synchronism with the frame timing outputted by the frame synchronizing circuit 13, an de-spreader 15 for de-spreading the baseband signal from the reception frequency converter 12 with a short spreading code w1 used to distinguish channels from each other, an de-spreader 16 for de-spreading an de-spread signal from the de-spreader 15 with the PN1 code generated by the PN1 generator 14, a PN2 generator 17 as a fourth element code generating means for generating a PN2 code based on the frame timing outputted by the frame synchronizing circuit 13 and a supplied peak value, a multiplier 18 for multiplying the PN1 code generated by the PN1 generator 14 and the PN2 code generated by the PN2 generator 17, a sliding correlator 19 as a correlated value calculating means for determining, with gradually varying timing, a correlated value between the de-spread signal from the de-spreader 16 and the PN2 code generated by the PN2 generator 17, a peak detector 20 for detecting a peak of the correlated value determined by the sliding correlator 19, an de-spreader 21 for de-spreading the baseband signal from the reception frequency converter 12 with a short spreading code w2 used to distinguish channels from each other, an de-spreader 22 for de-spreading an de-spread signal from the de-spreader 21 with a product spreading code generated by the multiplier 18, and a data demodulator 23 for demodulating an de-spread signal from the de-spreader 22. The peak value detected by the peak detector 20 is supplied to the PN2 generator 17, which generates a PN2 code based on the frame timing outputted by the frame synchronizing circuit 13 and the peak value detected by the peak detector 20.

Operation of the CDMA cellular system thus arranged will be described below.

First, a transmitting process carried out by the base station will be described below with reference to FIG. 2.

The spreader 32 spreads a perch channel indicative of the frame timing with the spreading code w0, and the spreaders 35-1 through 35-N spread transmission data (txdata1–N) in a plurality of channels other than the perch channel, with respective short orthogonal spreading codes w1 through wN, e.g., Walsh codes, that are used to distinguish the channels from each other.

The transmission data spread by the spreaders 35-1 through 35-N are added together by the adder 36.

The PN1 generator 33 generates a PN1 code which is shared by all the base stations, based on the frame timing generated by the frame timing generator 31.

The PN2 generator 34 generates a PN2 code which differs from base station to base station, based on the frame timing generated by the frame timing generator 31 and a phase or initial value which differs from base station to base station.

The multiplier 37 multiplies the spreading code (PN1 code) generated by the PN1 generator 33 and the spreading code (PN2 code) generated by the PN2 generator 34. The spreader 38 spreads sum transmission data from the adder 36 with the product spreading code from the multiplier 37. Since the chip rate does not change, the transmission data may be considered to be scrambled.

Thereafter, the adder 39 adds the perch channel spread by the spreader 32 and the transmission data spread by the spreader 38. The transmission frequency converter 40 converts the sum signal from the adder 39 into a radio signal, which is transmitted by the antenna 41.

The different spreading codes of the respective base stations may comprise Gold codes, for example. Gold codes may be generated using M sequences as two pseudo-random codes (PN sequences). Of the two PN codes of a Gold code, the PN1 code has a phase which is common to all the base stations (or the same initial value at the leading end of a frame is set in a M-sequence generating shift register), and the PN2 code has a phase which differs from base station to base station (or the same initial value at the leading end of a frame is set in a M-sequence generating shift register). In this manner, the different spreading codes of the respective base stations can be generated. If the PN codes have a length N, then it is possible to generate (N+2) codes (which do not agree with each other when cyclically shifted with respect to each other).

If it is assumed that a code "0" is converted into +1 and a code "1" into −1 for spreading data, then a Gold code generated by exlusive-ORing two PN codes may be considered to be a code produced when two PN codes are converted respectively into +1 and −1 and then multiplied by each other. In FIG. 2, all the codes are represented by +1 and −1 and the spreaders are implemented as multipliers for multiplying +1 and −1.

A receiving transmitting process carried out by the cellular terminal will be described below with reference to FIG. 3.

A radio signal having a radio frequency which is received by the antenna 11 is converted into a baseband signal by the reception frequency converter 12. If a cell search is required immediately after the cellular terminal is turned on, then the cellular terminal receives a perch channel, and the frame synchronizing circuit 13 achieves frame synchronization.

If a perch channel is being transmitted as a burst signal in a period synchronous with a frame using a short spreading code, then a matched filter is used to receive the short spreading code, and a peak value of an output signal from the matched filter is detected to detect frame timing. If a perch channel comprises a sequence having a length equal to the length of a frame, then frame timing may be detected by shifting the timing with the sliding correlator.

If a perch channel employs a connected spreading process for spreading unique words of a frame period using a short spreading code, then synchronization of the short spreading code is detected to synchronize the timing of the spreading code, and thereafter a sequence of unique words is detected from a sequence of demodulated signals for thereby detecting frame timing.

As described above, the frame synchronizing circuit 13 detects frame timing in a manner depending on the process of transmitting a perch channel. If a perch channel is detected at a plurality of times, them frame timing may be synchronized with a base station which transmits a signal whose reception level is the highest. This is because a base station which transmits a perch channel whose reception level is the highest is generally considered to be a base station closest to the cellular terminal or a base station subject to the best propagation conditions.

When the frame synchronizing circuit 13 detects frame timing, the PN1 generator 14 generates a PN1 code which is a spreading code in synchronism with the received signal.

The baseband signal converted from the received signal by the reception frequency converter 12 is despread by the de-spreader 15 with the short spreading code w1 used to distinguish channels from each other. Thereafter, the de-spread signal is further de-spread by the de-spreader 16 with the PN1 code generated by the PN1 generator 14.

The sliding correlator 19 determines, with gradually varying timing, a correlated value between the de-spread signal from the de-spreader 16 and the PN2 code generated by the PN2 generator 17. The peak detector 20 detects a peak of the correlated value determined by the sliding correlator 19.

The PN2 generator 17 locks the phase in timed relation to the detection of the peak by the peak detector 20. With the timing of the PN2 code being detected, a spreading code assigned to an individual base station can be generated.

Thereafter, the baseband signal converted from the radio signal from the antenna 11 by the reception frequency converter 12 is de-spread with the short spreading code w2 and the product of the PN1 and PN2 codes, thus obtaining received data rxdata.

The correlation between the received signal and the PN2 code may be determined by a process which does not employ the sliding correlator 19. For example, the received signal may be converted into a fast Fourier transform (FFT), which may be multiplied by a FFT of the PN2 code, after which the product may be converted into an inverse fast Fourier transform (IFFT) to determine a correlation between the received signal and the PN2 code.

Alternatively, partial sequences of PN2 may be detected to obtain timing candidates, and all sequences may be compared to check whether they are proper timing or not.

As described above, after frame synchronization has been achieved, the received signal is de-spread with only the code PN1 of the spreading codes (Gold codes) as combinations of two codes PN. In this manner, even a base station asynchronous system is capable of conducting a cell search using a sliding correlator as with the IS95 system which is a base station synchronous system.

If the base stations can be synchronized with each other using an external signal from the GPS or the like, then the phase or initial value of the PN2 code may be set to a predetermined fixed value for thereby dispensing with the detection of the timing of the PN2 code. Accordingly, the time to generate a spreading code can be shortened in the same manner as when the base stations are not synchronized with each other.

If the base stations are synchronized with each other, the initial value of the PN2 code may be set to "0", so that the spreading code comprises only the PN1 code. With this alternative, the time to generate a spreading code can also be shortened in the same manner as when the base stations are not synchronized with each other.

Although a certain preferred embodiment of the present invention has been shown and described in detail, it should be understood that various changes and modifications may be made therein without departing from the scope of the appended claims.

What is claimed is:

1. A CDMA cellular system comprising a plurality of mobile terminals and a plurality of base stations connected to said mobile terminals via radio links;

each of said base stations comprising:
first spreading means for spreading channel data with a first spreading code which is shared by all the base stations;
first element code generating means for generating a first element code which is in synchronism in time with said first spreading code;
second element code generating means for generating a second element code which differs from base station to base station;
multiplying means for generating a second spreading code which differs from base station to base station, based on said first element code generated by said first element code generating means and said second element code generated by said second element code generating means;
second spreading means for spreading the channel data based on said second spreading code generated by said multiplying means;
adding means for adding the channel data spread by said first spreading means and the channel data spread by said second spreading means; and
an antenna for transmitting sum channel data from said adding means;
each of said mobile terminals comprising:
detecting means for detecting said first spreading code;
third element code generating means for generating said first element code of said second spreading code in synchronism with timing of said first spreading code;
fourth element code generating means for generating said second element code out of synchronism with timing of said first spreading code;
de-spreading means for de-spreading a signal transmitted from one of said base stations based on said first element code; and
correlated value calculating means for calculating a correlated value between the signal de-spread by said de-spreading means and said second element code;
said fourth element code generating means comprising means for generating said second element code based on timing where the correlated value calculated by said correlated value calculating means is maximum.

2. A CDMA cellular system according to claim 1, wherein said second spreading code comprises a Gold code comprising a combination of two M sequences (Maximum length shift-resister sequences), said two M sequences including a first sequence which is generated based on a phase or initial value which is common to all the base stations and a second sequence which is generated based on a phase or initial value which varies from base station to base station.

3. A CDMA cellular system according to claim 1, wherein each of said second element code generating means and said fourth element code generating means comprises means for setting said second element code to a fixed value if all the base stations are synchronized with each other using an external timing signal.

4. A CDMA cellular system according to claim 2, wherein each of said second element code generating means and said fourth element code generating means comprises means for setting said second element code to a fixed value if all the base stations are synchronized with each other using an external timing signal.

5. A method of detecting a spreading code in a CDMA cellular system having a plurality of mobile terminals and a plurality of base stations connected to said mobile terminals via radio links, comprising the steps of:
transmitting, from one of said base stations, a channel spread based on a first spreading code which is common to all the base stations, and a channel spread based on a second spreading code which is generated by multiplying at least two element codes, at least one of which is in synchronism in time with said first spreading code and at least one of which is shifted in time from base station to base station;
detecting the first spreading code transmitted from said one of the base stations to match timing thereof in one of said mobile terminals;
synchronizing timing of a first element code of said second spreading code transmitted from said one of the base stations to the timing of said first spreading code in said one of the mobile terminals; and
detecting timing of a second element code of said second spreading code transmitted from said one of the base stations while being shifted with respect to the timing of said first spreading code in said one of the mobile terminals.

6. A method according to claim 5, wherein said second spreading code comprises a Gold code comprising a combination of two M sequences (Maximum length shift-resister sequences), said two M sequences including a first sequence which is generated based on a phase or initial value which is common to all the base stations and a second sequence which is generated based on a phase or initial value which varies from base station to base station.

7. A method according to claim 5, further comprising the steps of:
detecting said first spreading code in said one of the mobile terminals;
generating said first element code of said second spreading code in synchronism with the timing of said first spreading code in said one of the mobile terminals;
de-spreading a signal transmitted from said one of the base stations with said first element code;
calculating a correlated value between the de-spread signal and said second element code; and
identifying the second spreading code with timing where said correlated value is maximum.

8. A method according to claim 6, further comprising the steps of:
detecting said first spreading code in said one of the mobile terminals;
generating said first element code of said second spreading code in synchronism with the timing of said first spreading code in said one of the mobile terminals;
de-spreading a signal transmitted from said one of the base stations with said first element code;
calculating a correlated value between the de-spread signal and said second element code; and
identifying the second spreading code with timing where said correlated value is maximum.

9. A method according to claim 5, wherein said second element code is set to a fixed value if all the base stations are synchronized with each other using an external timing signal.

10. A method according to claim 6, wherein said second element code is set to a fixed value if all the base stations are synchronized with each other using an external timing signal.

11. A method according to claim 7, wherein said second element code is set to a fixed value if all the base stations are synchronized with each other using an external timing signal.

12. A CDMA cellular system comprising a plurality of mobile terminals and a plurality of base stations connected to said mobile terminals via radio links;
   each of said base stations comprising:
      first spreading means for spreading channel data with a first spreading code which is shared by all the base stations;
      first element code generating means for generating a first element code which is in synchronism in time with said first spreading code;
      second element code generating means for generating a second element code which differs from base station to base station;
      multiplying means for generating a second spreading code which differs from base station to base station, based on said first element code generated by said first element code generating means and said second element code generated by said second element code generating means;
      second spreading means for spreading the channel data based on said second spreading code generated by said multiplying means;
      adding means for adding the channel data spread by said first spreading means and the channel data spread by said second spreading means; and
      an antenna for transmitting sum channel data from said adding means.

13. A CDMA cellular system comprising a plurality of mobile terminals and a plurality of base stations connected to said mobile terminals via radio links;
   each of said mobile terminals comprising:
      detecting means for detecting a first spreading code which is shared by all the base station;
      first element code generating means for generating a first element code which is in synchronism in the time with said first spreading code of a second spreading code which differs from base station to base station in synchronism with timing of said first spreading code;
      second element code generating means for generating a second element code which differs from base station to base station out of synchronism with timing of said first spreading code;
      de-spreading means for de-spreading a signal transmitted from one of said base stations based on said first element code; and
      correlated value calculating means for calculating a correlated value between the signal de-spread by said de-spreading means and said second element code;
      said second element code generating means comprising means for generating said second element code based on timing where the correlated value calculated by said correlated value calculating means is maximum.

14. A CDMA cellular system comprising a plurality of mobile terminals connected to a plurality of base stations,
   each of the base stations comprising:
      a first spreader which spreads perch channel data using a first spreading code shared by the base stations;
      a first element code generator which produces a first element code substantially in synch with the first spreading code, the first element code being shared by the base stations;
      a second element code generator which produces a second element code unique for each base station;
      a multiplier which receives and multiplies the first and second element codes to produce a product element code;
      a second spreader which spreads transmission channel data using the product element code; and
      an adder which adds the outputs of the first and second spreader;
   each of the mobile stations comprising:
      a receiver which receives a reception signal;
      a detector coupled to the receiver and which detects the first spreading code in the reception signal;
      a third element code generator which produces the first element code substantially in synch with the first spreading code;
      a fourth element code generator which produces the second element code;
      a de-spreader which de-spreads the reception signal using the first element code;
      a correlator which determines a correlated value between the output of the de-spreader and the second element code; and
      a peak detector which receives the correlated value and determines a timing when the correlated value is at a maximum;
      wherein the fourth element code generator produces the second element code substantially in synch with the timing when the correlated value is at a maximum.

15. A base station in a CDMA cellular system, the base station comprising:
   a first spreader which spreads perch channel data using a first spreading code shared by base stations in the CDMA cellular system;
   a first element code generator which produces a first element code substantially in synch with the first spreading code, the first element code being shared by the base stations in the CDMA cellular system;
   a second element code generator which produces a second element code unique for each base station;
   a multiplier which receives and multiplies the first and second element codes to produce a product element code;
   a second spreader which spreads transmission channel data using the product element code; and
   an adder which adds the outputs of the first and second spreader.

16. A mobile station in a CDMA cellular system, the mobile station comprising:
   a receiver which receives a reception signal;
   a detector coupled to the receiver and which detects a first spreading code in the reception signal;
   a third element code generator which produces the first element code substantially in synch with the first spreading code;
   a fourth element code generator which produces a second element code;
   a de-spreader which de-spreads the reception signal using the first element code;
   a correlator which determines a correlated value between the output of the de-spreader and the second element code; and
   a peak detector which receives the correlated value and determines a timing when the correlated value is at a maximum;
   wherein the fourth element code generator produces the second element code in synch with the timing when the correlated value is at a maximum.

* * * * *